US010739155B2

(12) United States Patent
Blandin et al.

(10) Patent No.: US 10,739,155 B2
(45) Date of Patent: Aug. 11, 2020

(54) COGNITIVE ROUTE QUALITY-LEARNING SERVICE

(71) Applicant: International Business Machines Corporation, Armonk, NY (US)

(72) Inventors: Sebastien Blandin, Singapore (SG); Laura Wynter, Singapore (SG)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 207 days.

(21) Appl. No.: 15/720,007

(22) Filed: Sep. 29, 2017

(65) Prior Publication Data

US 2019/0101403 A1    Apr. 4, 2019

(51) Int. Cl.
| | | |
|---|---|---|
| G01C 21/34 | (2006.01) | |
| G08G 1/0968 | (2006.01) | |
| G08G 1/01 | (2006.01) | |
| H04W 4/029 | (2018.01) | |

(52) U.S. Cl.
CPC ..... *G01C 21/3484* (2013.01); *G01C 21/3415* (2013.01); *G01C 21/3446* (2013.01); *G08G 1/012* (2013.01); *G08G 1/0129* (2013.01); *G08G 1/09685* (2013.01); *G08G 1/096816* (2013.01); *G08G 1/096838* (2013.01); *G08G 1/096883* (2013.01); *G08G 1/096888* (2013.01); *H04W 4/029* (2018.02)

(58) Field of Classification Search
None
See application file for complete search history.

(56) References Cited

U.S. PATENT DOCUMENTS

| | | | | |
|---|---|---|---|---|
| 9,927,252 | B1* | 3/2018 | Chokshi | G01C 21/3461 |
| 10,133,275 | B1* | 11/2018 | Kobilarov | G05D 1/0055 |
| 2011/0307407 | A1* | 12/2011 | Neagu | G06Q 10/083 |
| | | | | 705/337 |
| 2014/0005934 | A1 | 1/2014 | Chia et al. | |
| 2015/0032424 | A1* | 1/2015 | Gupta | G01C 21/00 |
| | | | | 703/2 |
| 2016/0356603 | A1* | 12/2016 | Hajj | G01C 21/3423 |
| 2017/0262790 | A1* | 9/2017 | Khasis | G05D 1/0287 |
| 2017/0314944 | A1* | 11/2017 | Konig | G01C 21/3415 |
| 2018/0046961 | A1* | 2/2018 | Tulabandhula | G06K 9/00369 |
| 2018/0047091 | A1* | 2/2018 | Ogden | G06Q 30/0259 |
| 2018/0051997 | A1* | 2/2018 | Grochocki, Jr. | G01C 21/3415 |

(Continued)

OTHER PUBLICATIONS

Mel, et al. "The NIST Definition of Cloud Computng". Recommendations of the National Institute of Standards and Technology, Nov. 16, 2015.

(Continued)

*Primary Examiner* — Dale W Hilgendorf
*Assistant Examiner* — Alexander C. Bost
(74) *Attorney, Agent, or Firm* — Daniel P. Morris; McGinn IP Law Group, PLLC (57) ABSTRACT

A route-quality learning method, system, and computer program product include collecting a first route for a trip recommended from a first third-party application, collecting a second route for the trip recommended from a second third-party application, and after the trip is completed, estimating best alternatives given completion data of the trip and using the first third-party application and the second third-party application recommendation.

18 Claims, 5 Drawing Sheets

(56) References Cited

U.S. PATENT DOCUMENTS

2018/0297604 A1* 10/2018 Lindelof ................ B60K 28/02
2018/0309592 A1* 10/2018 Stolfus ................. G08G 1/0965
2018/0342157 A1* 11/2018 Donnelly ........... G01C 21/3492

OTHER PUBLICATIONS

Daehan Kwak, et al. "Doppel Driver: Counterfactual Actual Travel Times for Alternative Routes" 2015 IEEE International Conference on Pervasive Computing and Communications, Mar. 2015, p. 178-185.
Eran Ben-Elia et al. "If only I had Taken the Other Road: Regret, Risk and Reinforced Learning in Informed Route-Choice" ResearchGate, Transportation 40(2), Feb. 2012.

* cited by examiner

COGNITIVE ROUTE QUALITY-LEARNING SERVICE

BACKGROUND

The present invention relates generally to a route-quality learning method, and more particularly, but not by way of limitation, to a system, method, and computer program product for cognitive-enabled reasoning and learning about previous actions (e.g., transport routing) leveraging the pervasive sensing of Internet of Things (IoT) in the traffic space.

Conventionally, tools for personalized traffic information on mobile devices have been developed in which traffic predictions along a driver's usual route were provided in advance of the journey. This leverages the pervasive sensing available in IoT capabilities of mobile and in-vehicle devices. However, the conventional techniques have limitations, such as, the driver's route taken may not have been the best choice, but the driver is unable to know whether or not it is the case since only an after-the-fact service could provide such information and this precludes effective learning. Further, the conventional routing applications may be unable to integrate unstructured sources of information that the driver is accumulating, such as crowd sentiment, social events along the routes, driving behaviors, route preferences, etc. thereby neglecting crucial data sources in their learning process.

SUMMARY

In an exemplary embodiment, the present invention can provide a computer-implemented route-quality learning method on a floating gate, the method including a computer-implemented route-quality learning method, the method including collecting a first route for a trip recommended from a first third-party application, collecting a second route for the trip recommended from a second third-party application, and after the trip is completed, estimating best alternatives given completion data of the trip and using the first third-party application and the second third-party application recommendation. One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIGS. 1-5, in which like reference numerals refer to like parts throughout. It is emphasized that, according to common practice, the various features of the drawings are not necessarily to scale. On the contrary, the dimensions of the various features can be arbitrarily expanded or reduced for clarity.

Figure 1:
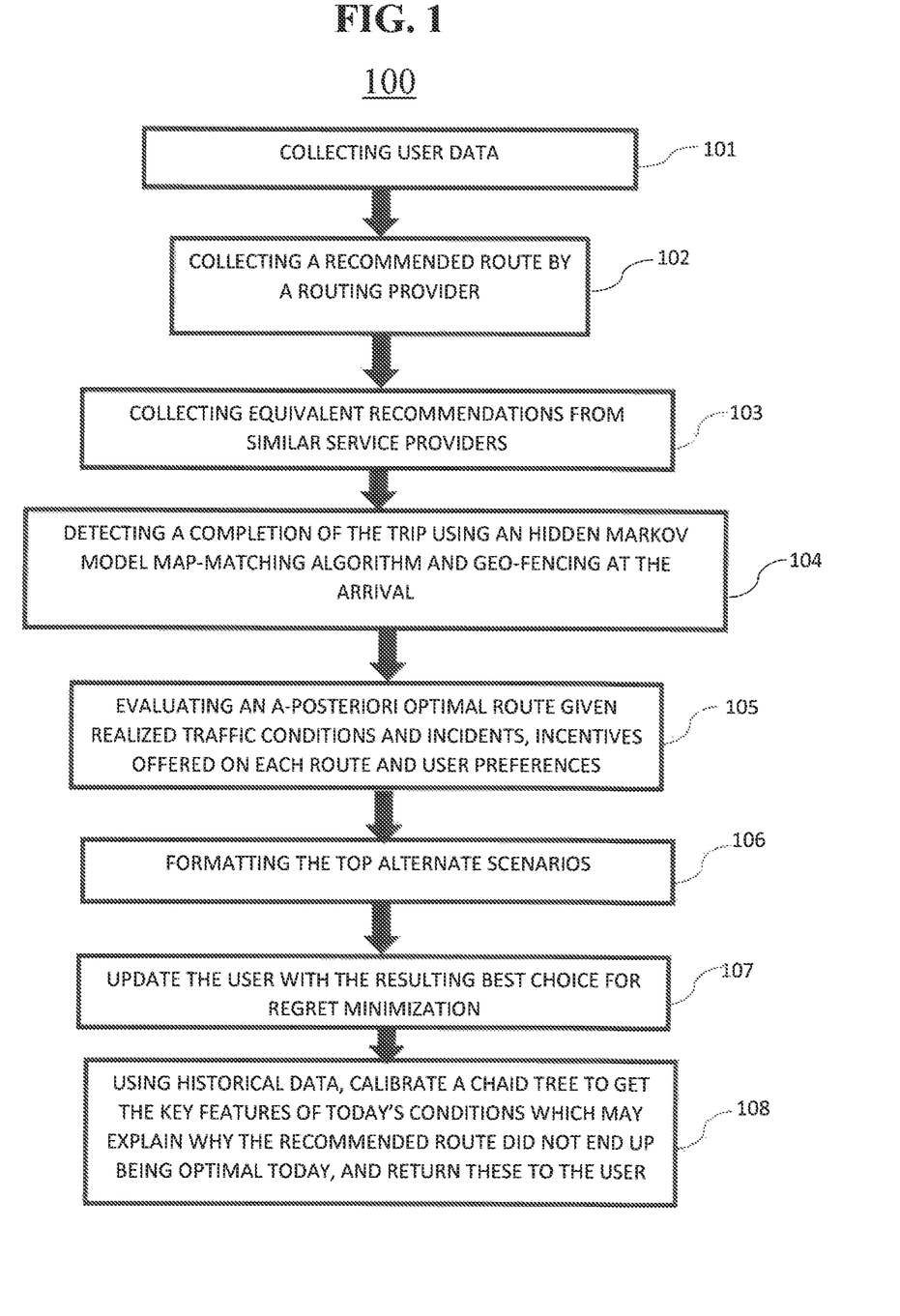
FIG. 1 exemplarily shows a high-level flow chart for a route-quality learning method 100 according to an embodiment of the present invention.

By way of introduction of the example depicted in FIG. 1, an embodiment of a route-quality learning method 100 according to the present invention can include various steps for keeping track of recommended and alternate options recommended by third-party services, and would provide the user with an objective evaluation of the best service provider post-usage. Or, in other embodiments, the method 100 can assess the accuracy of routing engine recommendations after the fact, i.e. when the trip is completed, which helps the user assess the trust worthiness of the applications. Furthermore, the method 100 can also help the user understand in which conditions specific routing applications can be trusted or not, and seek active feedback from the user on his preferences.

Figure 3:
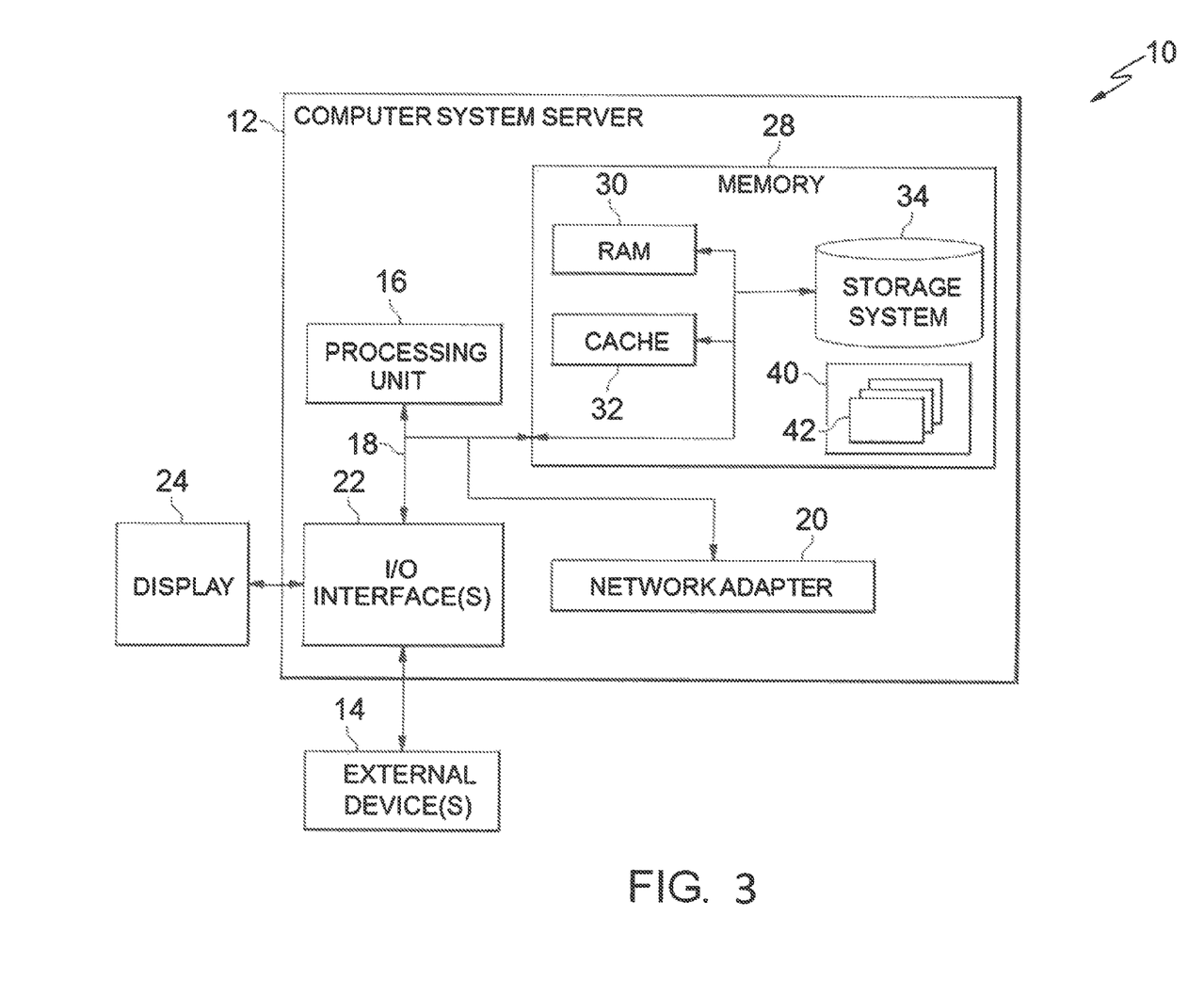
FIG. 3 depicts a cloud-computing node 10 according to an embodiment of the present invention.

By way of introduction of the example depicted in FIG. 3, one or more computers of a computer system 12 according to an embodiment of the present invention can include a memory 28 having instructions stored in a storage system to perform the steps of FIG. 1.

Figure 2:
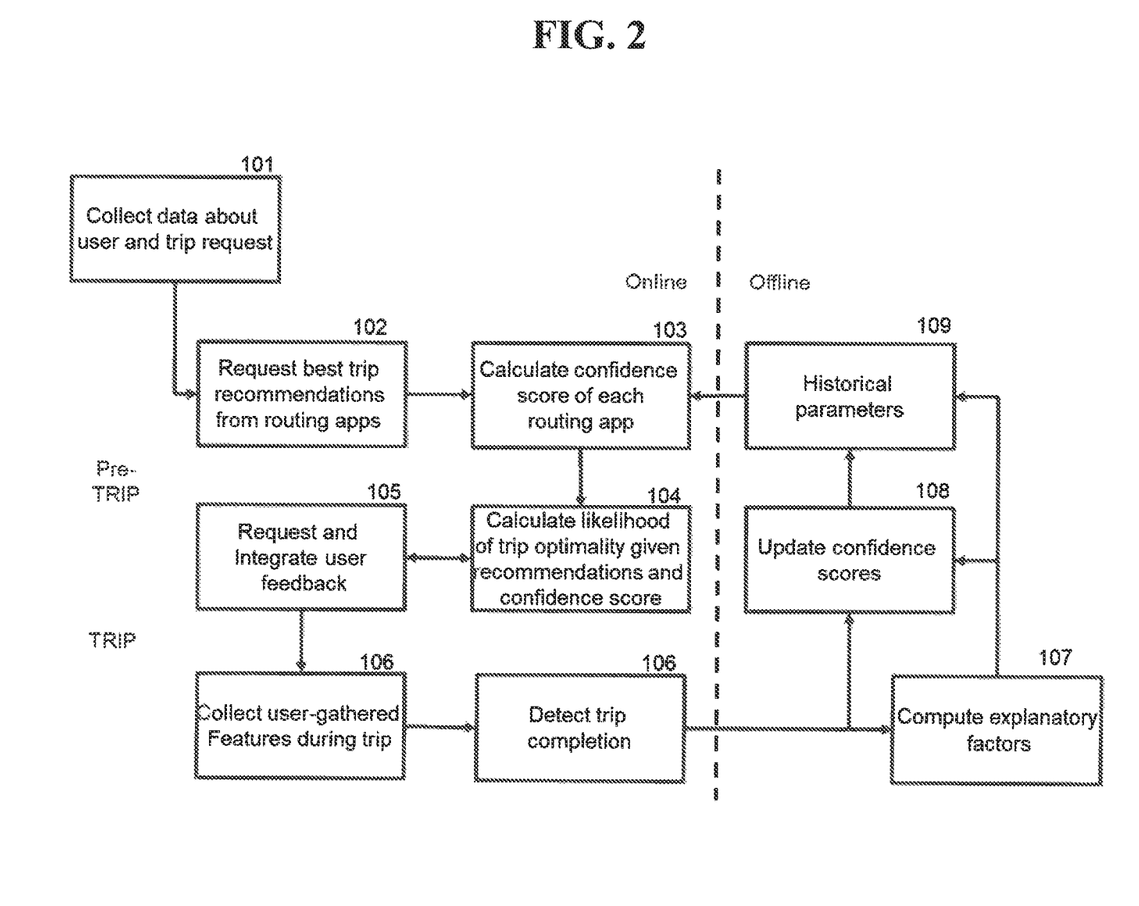
FIG. 2 exemplarily depicts a system diagram of an embodiment of the present invention.

Referring to FIGS. 1 and 2, in step 101, data is collected on the user's trip. For example, data can be collected relating to the user's current location, desired destination, e.g. from the user's navigation device or navigation smartphone app, departure time, etc.

In step 102, recommendations from routing service providers (i.e., third-party applications) are collected, and in step 103, equivalent recommendations are collected from similar (i.e., for purposes of the present application, "similar" may mean other route-provider services) service providers. For example, a first recommended route from a first third-party navigation program is collected and then a second recommended route from a second third-party navigation program is collected. In other words, in steps 102-103, at least two different recommended routes are collected from at least two different third party navigation programs.

In step 104, a completion of the trip is detected using, for example, a Hidden Markov Model (HMM) map-matching algorithm and geo-fencing at the arrival.

In step 105, best alternatives are estimated given routing service providers recommendations and prior confidence scores. That is, an a-posteriori optimal route is evaluated given current conditions such as traffic conditions, incidents, incentives offered on each route (i.e., scenic, highway only, less traffic but longer travel time, no tolls driving, etc.), and user preferences.

In step 106, top alternative routes are formatted by updating a decision from step 105 given user input and computing best decision. That is, the best routes are ranked and displayed for the user. For example, the top alternate scenarios are formulated as "if you have taken route x, x' you would have saved t, t' minutes and would have been offered the discount d, d'". Thus, the embodiments can learn from prior completions of the trip, best alternatives, and then can provide top alternatives during a second run phase of the invention. In other words, the invention may learn from the user's actions and then provide updated alternative routes.

In step 107, the optimal route algorithms are updated to update the user with the resulting best route for regret minimization. In step 107, additional user-gathered information is collected during the trip and quality of prior recommendations are assessed.

In step 108, a belief system for the best alternative routes is updated given all historical realizations. For example, using the historical data, a Chi-square automatic interaction detections (CHAID) tree can be calibrated to get the key features of today's conditions which may explain why the recommended route did not end up being optimal today, and return these to the user. The user can be provided with data-supported feedback on routing service providers' quality.

It is noted that in some embodiments, key features of the optimal route which differentiate it from the chosen route are provided to the user. For example, "route avoids waste management plant", "route avoids toll roads", "route around historically high accident area", etc.

Also, the best decision for a route can be updated or achieved by considering factors such as financing decisions, retail and purchase applications, web browsing, etc.

Thus, the embodiments described herein can provide an after-the-fact certification service that can be deployed in a straightforward manner as a cloud-based app, which keeps track of recommended and alternate options recommended by third-party services (and interacts with existing third-party services). The embodiments can provide the user with an objective evaluation of the best service provider post-usage. In other words, the invention may learn from the user's usage of third-party route providers and then update/modify the routes to optimize the routes for the user.

In so doing, the embodiments described herein can provide an open cognitive system that provides the components needed to educate the traveler without the confidence-reducing-effect of many analytics systems that propose black-box route guidance to travelers.

In one exemplary embodiment, during a road journey example, a user can open a first route calculating application to get a route recommendation. Several routes are recommended. The claimed invention can store these routes, as well as recommended routes by a second, third, or more route calculating application, and upon arrival would let the user know which application proved to be the best for that trip. Or, based on past learning from which application provides the best route, optimize or combine the routes from each application to provide a more tailored route to the user.

Also, the embodiments described herein can provide a solution for why the route taken was not the best one today, i.e. the set of features which differentiate the optimal route from the route taken and may explain why routing providers recommended a suboptimal option.

In one exemplary embodiment, a driver chooses plan A which predicts a one hour trip from home to the office. The driver executes Plan A and it takes him hour and forty-five minutes to make the trip. Plan B forecasted an hour and thirty minute trip and the post analysis says that Plan B would have taken an hour and fifty minutes. Plan C forecasted a an hour and fifty minutes trip and the post analysis says that Plan C would have taken an hour and fifty minutes. Plan A had the lowest accuracy but it got the driver to his goal in the shortest time. Plan C was exactly right but it took the longest time to get the driver to his goal. Thus, over time, the system may learn from trips to determine if the best alternatives estimated are actual best alternatives.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of distributed computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third-party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third-party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable node and is not intended to suggest my limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network, in a distributed cloud computing environment, program modules may be located in both local and remote computer system storage media including memory storage circuits.

Referring now to FIG. 3, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
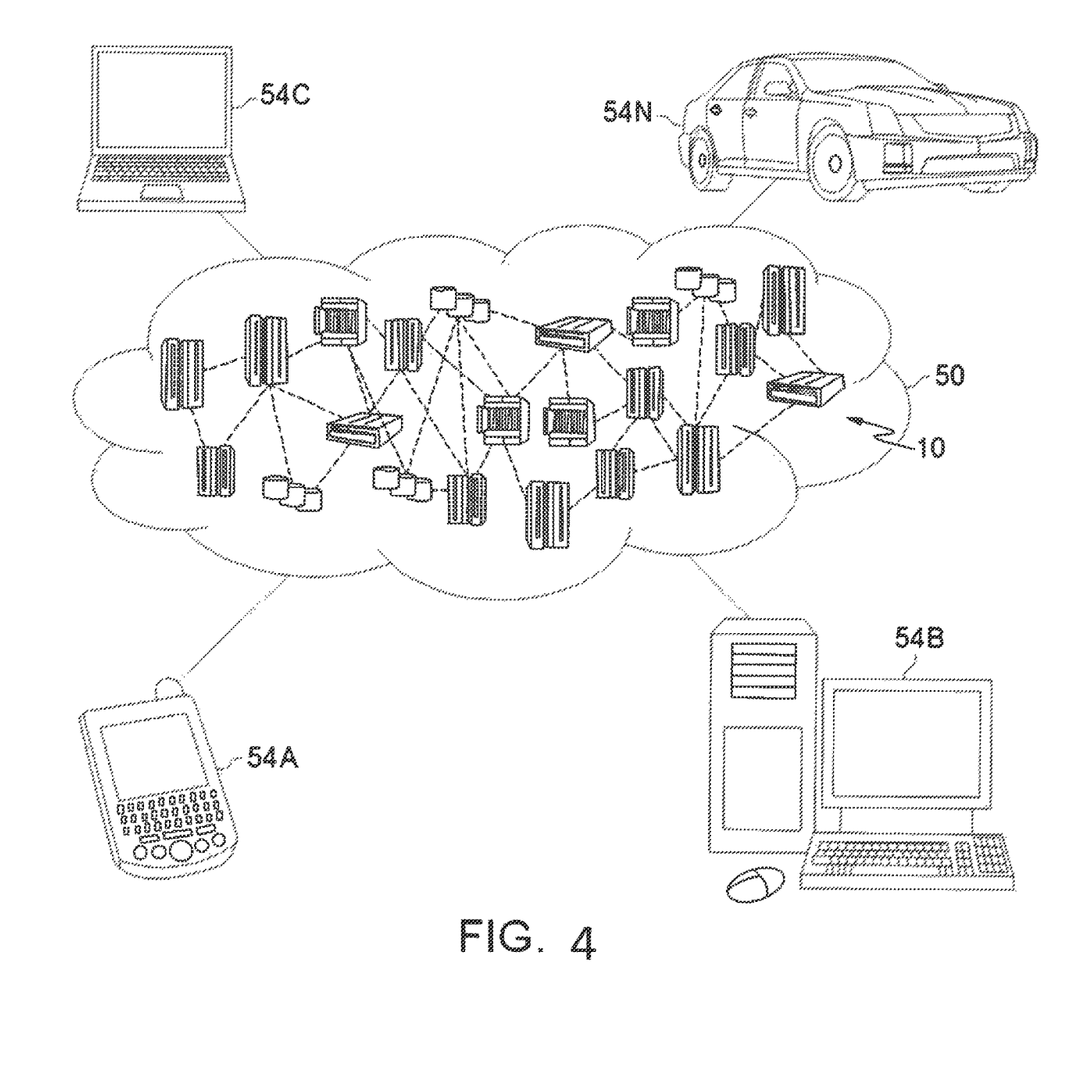
FIG. 4 depicts cloud-computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
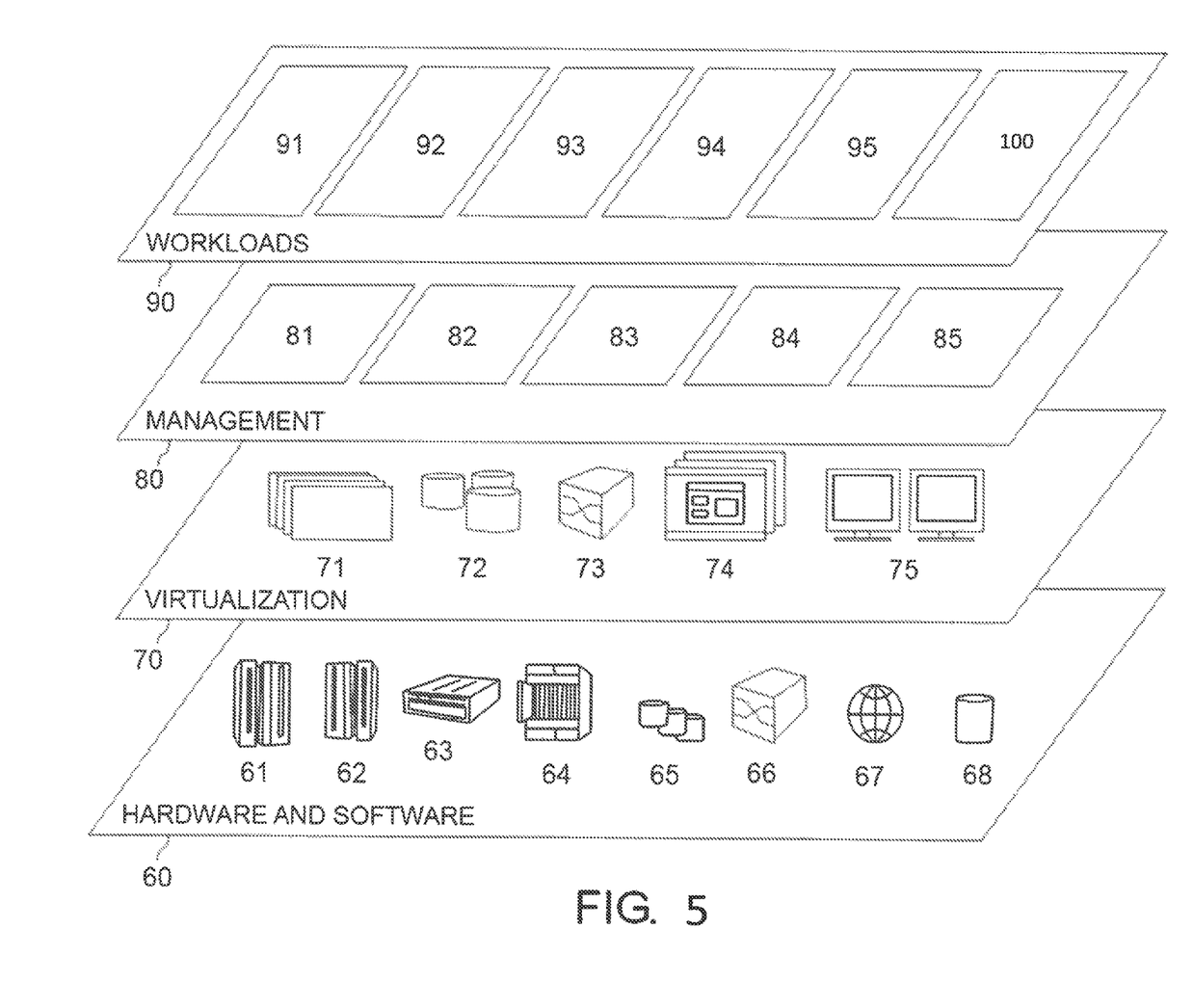
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Route-quality learning method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a Storage Area Network (SAN), a Network Attached Storage (NAS) device, a Redundant Array of Independent Discs (RAID), an erasable programmable read-only memory (EPROM or Flash memory), a static random access memory (SRAM), a portable compact disc read-only memory (CD-ROM), a digital versatile disk (DVD), a memory stick, a USB "thumb" drive, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented route-quality learning method, the method comprising:
    collecting a first route for a trip recommended from a first third-party application;
    collecting a second route for the trip recommended from a second third-party application;
    comparing the current location of a user with a destination of the user as the user travels along the first route or the second route during the trip;
    detecting, via map-matching or geo-fencing, an arrival of the user at the destination during the trip;
    responsive to detecting the arrival of the user at the destination during the trip, estimating sub-optimal alternatives for the trip given completion data of the trip using both the first third-party application and the second third-party application recommendation, the sub-optimal alternatives being based on a route starting at the same time as the first route and the second route, being based on an entirety of the trip being completed from a start point to an end point of the trip, and the sub-optimal alternatives being routes that have a longer trip time than the first route and the second route at the time of taking the trip; and
    during a second trip by the user at a later time after the trip is completed, recommending one of the sub-optimal alternatives for the trip as a route to take for the second trip,
    wherein an explanation of a set of features are provided which differentiate an optimal route from the sub-optimal alternatives, and wherein the first route, the second route, and the sub-optimal alternatives are displayed for the user in a format indicating a time saved by taking the one of the sub-optimal alternatives.

2. The method of claim 1, wherein the alternatives are estimated given current conditions including:
   a traffic condition;
   an incident report;
   an incentive offered on each route; and
   a user preference.

3. The method of claim 1, further comprising updating a calculation factor of the sub-optimal alternatives based on a user preference for a first type of alternative route over a second type of alternative route.

4. The method of claim 1, further comprising updating the sub-optimal alternatives for the user according to user preferences.

5. The method of claim 1, wherein the sub-optimal alternatives are determined using a belief system that is updated for given historical realizations once the trip is completed.

6. The method of claim 5, wherein a CHAID tree is calibrated to provide a key feature of present conditions that alters the sub-optimal alternatives from previously provided alternative routes.

7. The method of claim 1, further comprising providing a reason that a first alternative route is ranked higher than a second alternative route.

8. The computer-implemented method of claim 1, performed in a cloud-computing environment.

9. A computer program product for route-quality learning, the computer program product comprising a computer-readable storage medium having program instructions embodied therewith, the program instructions executable by a computer to cause the computer to perform:
   collecting a first route for a trip recommended from a first third-party application;
   collecting a second route for the trip recommended from a second third-party application;
   comparing the current location of a user with a destination of the user as the user travels along the first route or the second route during the trip;
   detecting, via map-matching or geo-fencing, an arrival of the user at the destination during the trip;
   responsive to detecting the arrival of the user at the destination during the trip, estimating sub-optimal alternatives for the trip given completion data of the trip using both the first third-party application and the second third-party application recommendation, the sub-optimal alternatives being based on a route starting at the same time as the first route and the second route, being based on an entirety of the trip being completed from a start point to an end point of the trip, and the sub-optimal alternatives being routes that have a longer trip time than the first route and the second route at the time of taking the trip; and
   during a second trip by the user at a later time after the trip is completed, recommending one of the sub-optimal alternatives for the trip as a route to take for the second trip,
   wherein an explanation of a set of features are provided which differentiate an optimal route from the sub-optimal alternatives, and wherein the first route, the second route, and the sub-optimal alternatives are displayed for the user in a format indicating a time saved by taking the one of the sub-optimal alternatives.

10. The computer program product of claim 9, wherein the alternatives are estimated given current conditions including:
    a traffic condition;
    an incident report;
    an incentive offered on each route; and
    a user preference.

11. The computer program product of claim 9, further comprising updating a calculation factor of the sub-optimal alternatives based on a user preference for a first type of alternative route over a second type of alternative route.

12. The computer program product of claim 9, further comprising updating the sub-optimal alternatives for the user according to user preferences.

13. The computer program product of claim 9, wherein the sub-optimal alternatives are determined using a belief system that is updated for given historical realizations once the trip is completed.

14. The computer program product of claim 13, wherein a CHAID tree is calibrated to provide a key feature of present conditions that alters the sub-optimal alternatives from previously provided alternative routes.

15. The computer program product of claim 9, further comprising providing a reason that a first alternative route is ranked higher than a second alternative route.

16. A route-quality learning system, the system comprising:
    a processor; and
    a memory, the memory storing instructions to cause the processor to perform:
    collecting a first route for a trip recommended from a first third-party application;
    collecting a second route for the trip recommended from a second third-party application;
    comparing the current location of a user with a destination of the user as the user travels along the first route or the second route during the trip;
    detecting, via map-matching or geo-fencing, an arrival of the user at the destination during the trip;
    responsive to detecting the arrival of the user at the destination during the trip, estimating sub-optimal alternatives for the trip given completion data of the trip using both the first third-party application and the second third-party application recommendation, the sub-optimal alternatives being based on a route starting at the same time as the first route and the second route, being based on an entirety of the trip being completed from a start point to an end point of the trip, and the sub-optimal alternatives being routes that have a longer trip time than the first route and the second route at the time of taking the trip; and
    during a second trip by the user at a later time after the trip is completed, recommending one of the sub-optimal alternatives for the trip as a route to take for the second trip,
    wherein an explanation of a set of features are provided which differentiate an optimal route from the sub-optimal alternatives, and wherein the first route, the second route, and the sub-optimal alternatives are displayed for the user in a format indicating a time saved by taking the one of the sub-optimal alternatives.

17. The system of claim 16, wherein the alternatives are estimated given current conditions including:
    a traffic condition;
    an incident report;
    an incentive offered on each route; and
    a user preference.

18. The system of claim 16, embodied in a cloud-computing environment.

\* \* \* \* \*